Dec. 30, 1969    C. M. CASON III    3,487,466
LOW PRESSURE GAS DENSITY FLUCTUATION SPECTROMETER
USING AN AMPLITUDE MODULATED ELECTRON BEAM TO
INDUCE LUMINOUSITY IN THE GAS
Filed July 25, 1968
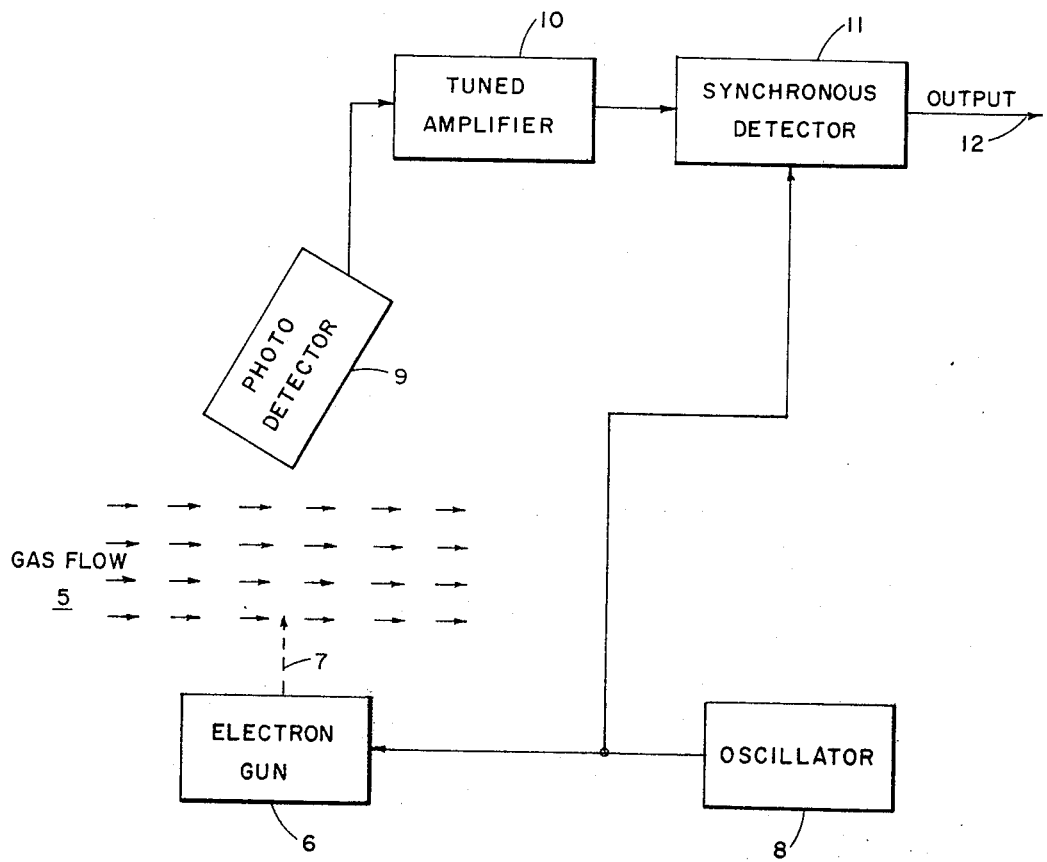
Charles M. Cason III,
INVENTOR
BY 3,487,466
Patented Dec. 30, 1969

3,487,466
LOW PRESSURE GAS DENSITY FLUCTUATION SPECTROMETER USING AN AMPLITUDE MODULATED ELECTRON BEAM TO INDUCE LUMINOSITY IN THE GAS
Charles M. Cason III, Huntsville, Ala., assignor to the United States of America as represented by the Secretary of the Army
Filed July 25, 1968, Ser. No. 747,594
Int. Cl. G01n 21/12; H01j 37/26
U.S. Cl. 250—71                              3 Claims

ABSTRACT OF THE DISCLOSURE

An electron beam is injected into a low pressure gas stream. The electron beam is amplitude modulated at a high frequency. The beam causes a luminous spectra to be emitted by the gas, dependent on the gas density. The spectra is detected by a photodetector, passed through a tuned amplifier, and applied to one input of a synchronous detector. The other input of the synchronous detector is the high frequency which modulates the electron beam. The output of the synchronous detector is thus related to the luminous spectra induced by the electron beam, from which the gas density may be obtained, and which is usable even if the gas has background spectra.

BACKGROUND OF THE INVENTION

This invention generally relates to the measurement of local gas densities in low density gas flows. There are various known methods of detecting the local density of flowing gases. These methods include optical methods, such as Schlieren light refraction. Other methods use electrical discharges in the gases, measure the attenuation of electromagnetic radiation through the gases, and so on. The subject is well discussed in U.S. Patent No. 2,952,776 of Sept. 13, 1960. This patent teaches the injection of a beam of ions or electrons into a low pressure gas, and the observation of the resulting short-lived fluorescence. This patent does not have any way of distinguishing the desired short-lived fluorescence from any short-lived fluorescence that may already be present in the gas. The present invention is able to so distinguish.

SUMMARY OF THE INVENTION

A modulated electron beam is injected into a flowing low-pressure gas. A luminous spectra results, and is detected by a photodetector. The photodetector, through a tuned amplifier, feeds one input of a synchronous detector, and the other input of the synchronous detector is from the modulating signal for the electron beam. The output of the synchronous detector is related to the local density of the gas.

BRIEF DESCRIPTION OF THE DRAWING

The single drawing figure is a schematic diagram of the invention.

DESCRIPTION OF THE PREFERRED EMBODIMENT

Referring to the drawing, a gas whose local density it is desired to measure is generally designated 5. It should be understood that the gas is confined to a suitable container of carrier (not shown). Electron gun 6 is provided, and injects a beam of electrons 7 into the gas. The structural and electrical details of 6 are not shown, inasmuch as they are well known in the art. The electron beam is modulated by the output of oscillator 8. As discussed above, electron beam 7 induces a luminous spectra in 5. This spectra is detected by photodetector 9, which may be a photovoltaic cell. The output of 9 is amplified by an amplifier 10 tuned to the operating frequency of oscillator 8. The output of 10 is applied to the signal input of synchronous detector 11, with the output of oscillator 8 connected to control input to 11. Output 12 of detector 11 is therefore indicative of the luminous spectra induced in the gas by the electron beam. The spectra is related to the local gas density. Background spectra from the gas is effectively suppressed.

The D.C. signal level from 12 is directly proportional to the unknown gas density in 5 for a constant applied electron beam current.

What I claim is:
1. A system for detecting the local density of a low pressure gas flow comprising: an electron gun for generating and injecting an electron beam into said gas; modulator means connected to said electron gun; photodetector means positioned to view said gas where said electron beam is injected; and a synchronous detector with the signal input thereof connected to said photodetector and the control input thereof connected to said modulator means.
2. The system of claim 1 wherein said modulator means is an oscillator.
3. The system of claim 1 or 2 wherein said photodetector means includes an amplifier tuned to the frequency of said oscillator.

References Cited
UNITED STATES PATENTS

| | | | |
|---|---|---|---|
| 2,952,776 | 9/1960 | Schumacher et al. | 250—71 |
| 2,975,966 | 3/1961 | Howard. | |
| 3,319,071 | 5/1967 | Werth et al. | |
| 3,334,235 | 8/1967 | Zarowin | 250—71 X |

RALPH G. NILSON, Primary Examiner

M. J. FROME, Assistant Examiner

U.S. Cl. X.R.
250—49.5, 71.5